(12) United States Patent
DeFoor

(10) Patent No.: US 6,378,246 B1
(45) Date of Patent: Apr. 30, 2002

(54) METHOD AND APPARATUS FOR GROWING VINED PRODUCE

(76) Inventor: Terril R. DeFoor, 5113 Norris, Clovis, NM (US) 88101

( * ) Notice: Subject to any disclaimer, the term of this patent is extended or adjusted under 35 U.S.C. 154(b) by 0 days.

(21) Appl. No.: 09/566,001

(22) Filed: May 5, 2000

(51) Int. Cl.[7] .............................................. A01G 31/00
(52) U.S. Cl. ............................... 47/62 R; 47/60; 47/39; 47/66.7
(58) Field of Search .......................... 47/62 R, 60, 66.6, 47/66.7, 67, 39, 102, 82, 83, 901, 58, 17, 19; 248/27.8

(56) References Cited

U.S. PATENT DOCUMENTS

| 1,743,987 A |   | 1/1930  | Tinaglia |         |
|-------------|---|---------|----------|---------|
| 3,467,609 A |   | 9/1969  | Adams et al. |     |
| 3,613,309 A |   | 10/1971 | Coburn   |         |
| 3,882,634 A | * | 5/1975  | Dedolph  | 47/1.2  |
| 3,909,978 A |   | 10/1975 | Fleming  |         |
| 3,973,353 A | * | 8/1976  | Dedolph  | 47/1.2  |
| 3,998,007 A | * | 12/1976 | Martin   | 47/39   |
| 4,175,355 A |   | 11/1979 | Dedolph  |         |
| 4,250,666 A | * | 2/1981  | Rakestraw| 47/83   |
| 4,420,902 A |   | 12/1983 | Rayner   |         |
| 4,748,770 A |   | 6/1988  | Cline    |         |
| 5,333,409 A |   | 8/1994  | Mendes   |         |
| 5,515,648 A |   | 5/1996  | Sparkes  |         |
| 5,617,673 A | * | 4/1997  | Takashima| 47/60   |
| 6,109,011 A | * | 8/2000  | Iyer et al. | 56/239 |

FOREIGN PATENT DOCUMENTS

JP        402257812 A    * 10/1990    ............ A01G/9/00

* cited by examiner

Primary Examiner—Peter M. Poon
Assistant Examiner—Andrea M. Valenti
(74) Attorney, Agent, or Firm—Vickers, Daniels & Young

(57) ABSTRACT

Apparatus for growing vined produce such as tomatoes comprises a container rotatable about a horizontal axis and supported above an underlying surface, which container has an interior filled with rooting media, a plant opening, radially through the container wall for the vine of a tomato plant rooted therein to extend outwardly of the container. As the vine continues to grow outwardly of the container, tomatoes on the vine are harvested therefrom and the container is periodically rotated to wind the vine thereabout throughout the life of the plant. The container also includes feeding openings into the rooting media, and the container can be mounted on a stand provided with a nutrient reservoir and pump and a grow light which are periodically turned on and off by a control timer.

49 Claims, 3 Drawing Sheets

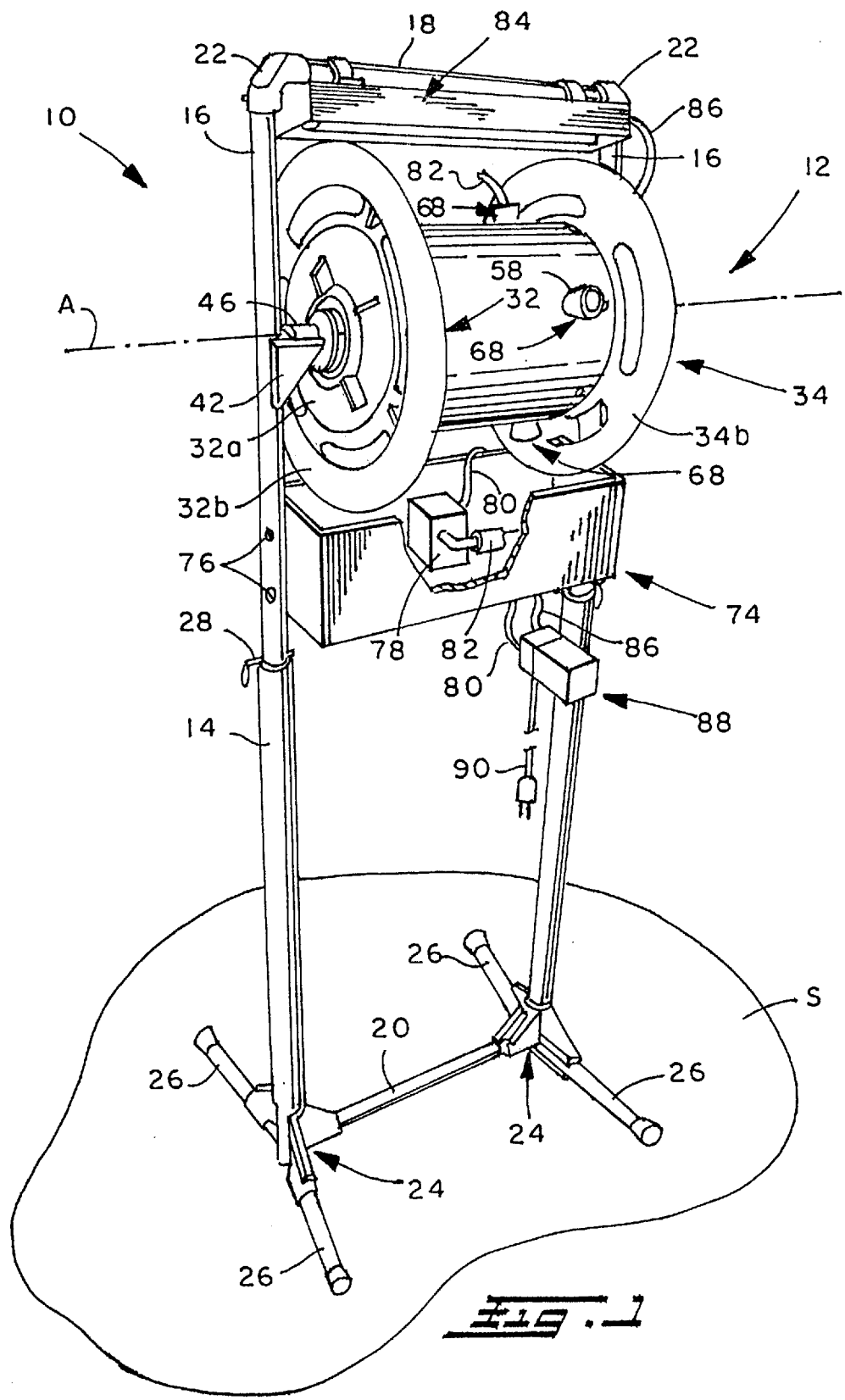

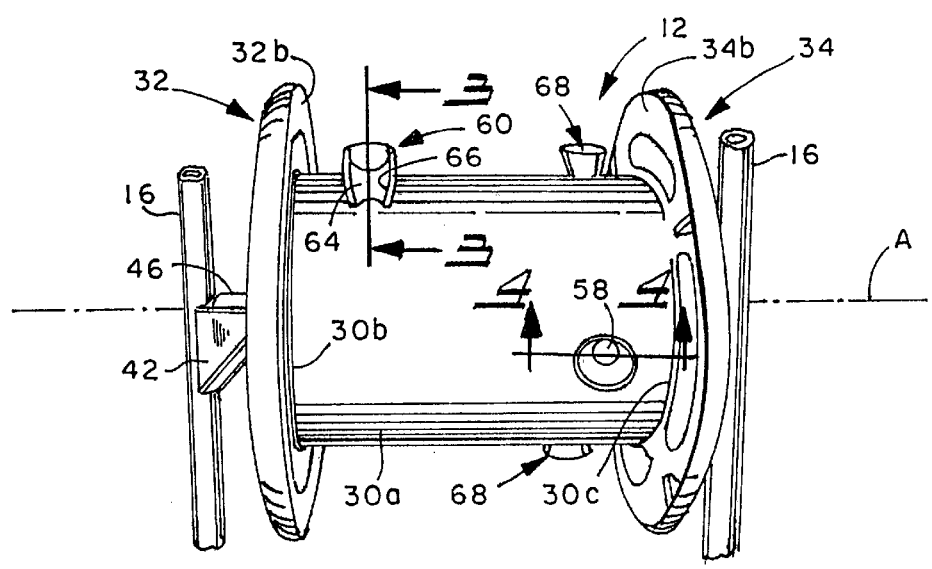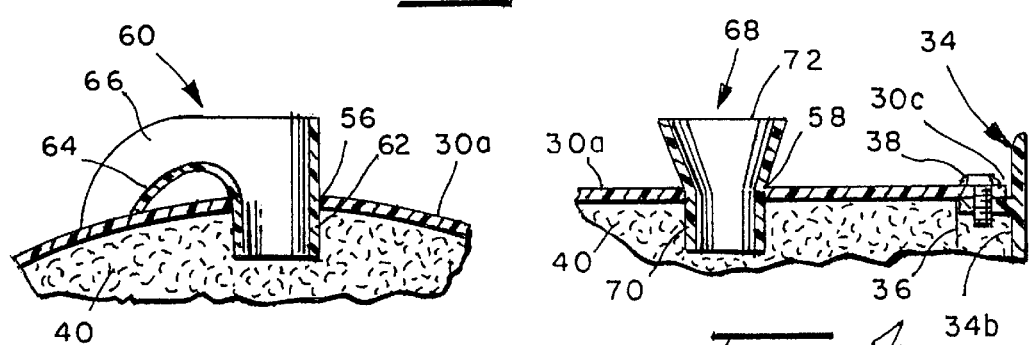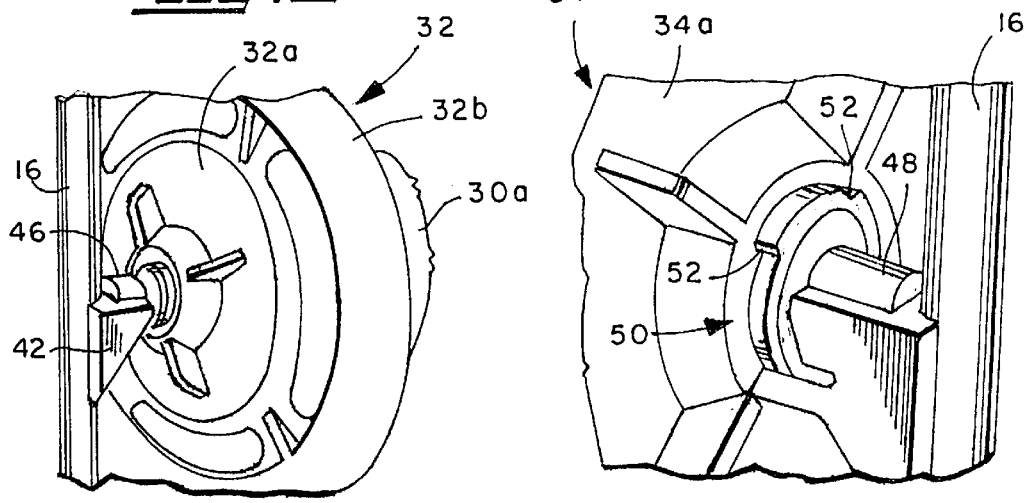

METHOD AND APPARATUS FOR GROWING VINED PRODUCE

BACKGROUND OF THE INVENTION

This invention relates to the art of horticulture, more particularly, to a method and apparatus for growing vined produce.

The invention is disclosed in detail in connection with the growing of tomatoes. However, it will be appreciated that the invention is applicable to the growing of other vined produce such as, for example, cucumbers, squash, beans, and the like.

As is well known, tomatoes grow on a vine which is a plant whose stem requires support by clipping the vine to a support provided therefor. In connection with the growing of tomatoes, it is likewise well known to provide stakes and/or strings for the tomato vine to be attached to as it grows upward from the ground or, a potting vessel such as in a greenhouse. The growing of tomatoes in such a conventional manner is time-consuming in requiring the placement of stakes and/or strings and the initial clipping of the vine thereabout. The latter for a person growing tomatoes in their home garden requires daily maintenance to assure the necessary connection between the vine and stake or strings, and in connection with commercial growth of tomatoes such as in a greenhouse, clips are used to fasten the vine to the strings along the lengths thereof. The clips are put on the plants at least once every two weeks, and this procedure is very time-consuming and labor intensive. Furthermore, during growth the base of the plant becomes susceptible to breakage, causing loss of the plant.

Another labor intensive and time-consuming job in connection with the growing of tomatoes either in a home garden or in a greenhouse is that of spraying the plants for eliminating insects and other pests. In this respect, such insects and pests harbor under the leaves of a tomato plant attached to a stake or string, and the leaves act like an umbrella which protects the pests from sprays and the like. Accordingly, these leaves from the ground up must be lifted to expose the underside and then sprayed, and such effort in connection with the leaves close to the ground requires the person undertaking the spraying to kneel or bend down, both of which are physically tiring for the person. Another problem in connection with both home gardens and greenhouses results from the fact that the tomato seedlings are on the ground or floor in growing pots and, accordingly, are susceptible to damage or destruction, such as by rodents which eat the seedlings.

SUMMARY OF THE INVENTION

In accordance with the present invention, a method and apparatus is provided for growing tomatoes in a manner which eliminates and/or minimizes the foregoing problems encountered in connection with conventional methods of growing tomatoes. More particularly in this respect, a tomato plant in accordance with the present invention is grown by rooting a tomato seedling in a container which is rotatable about a horizontal axis and supported above an underlying surface for rotation about the axis, and periodically rotating the container about its axis as the plant grows to progressively wind the tomato vine about the container. The container is periodically provided with a nutrient to promote growth of the tomato vine, and the tomatoes are periodically harvested from the vine, whereby the harvested portion of the vine is wrapped around the container and supported thereby.

The growing of tomatoes in accordance with the present invention advantageously eliminates the need for growing poles, guide strings and bridging boards which are often used in greenhouses between adjacent growing bags to support the stem of the tomato vine to assure that the latter remains off the floor so as to be less likely to contact any viruses. In connection with the growing of tomatoes in greenhouses, elimination of poles, guide strings and bridging boards eliminates the floor space and lateral growing area heretofore required for the spread of guide strings and, in connection with both greenhouses and domestic tomato growing, the invention advantageously reduces the time and/or labor and/or expense required in connection with conventional tomato growing. A reduction in expense for a greenhouse is further promoted by eliminating clips heretofore used to fasten plants to guide strings. Further advantage is realized by growing the tomatoes in an area spaced above the floor or ground in that the latter promotes a sterile climate in a greenhouse by providing for the underlying floor or ground to be free of plants and growing bags or other growing containers while reducing the cleaning effort required in a greenhouse environment. In connection with both greenhouse and domestic growing of tomatoes, elevation of the growing area reduces and/or eliminates pest and virus problems by making the undersides of the leaves of the tomato plant easy to access for spraying. Moreover, elevation of the growing area eliminates damage caused by rodents eating the plants as well as potential damage to the plants caused by poisons used to eliminate rodents, and elevation of the growing area makes the feeding and pollinating of the plants easier than with plants grown conventionally. Of further advantage is the fact that tomatoes can be grown by apartment dwellers who have no yard and inside by homeowners who do not want to dedicate a part of their yard to a garden.

Tomatoes grown in accordance with the present invention ripen as much as 30 days earlier than those grown conventionally and, in this respect, are in clusters on top of the growing container which allows the tomatoes to be exposed to more direct sunlight throughout the day. In this respect, the clusters will get as much as 80% more sunlight than tomatoes growing from the ground up along guide poles or strings due, in part, to shading of tomatoes on a vine by leaves thereabove. In connection with the growing of tomatoes in a greenhouse environment, the floor is free of growing containers and thus can be painted white to reflect light and improve light throughout the greenhouse. All of these factors result in an increased production per plant compared to the production realized with conventional methods in which the vines are grown from the ground up. Still further advantage is realized in growing tomatoes in accordance with the present invention in that the rotatable containers used are adapted to be easily cleaned, sterilized and reused, whereas conventional growing bags have to be replaced at the end of each growing season. Moreover, the tomatoes ripen on the top area of the container and are easily harvested without having to bend over, kneel down or the like, and the winding of the tomato vine about the container as growth progresses eliminates plant breakage which is often encountered in growing the vines from ground up. Yet another advantage is realized in that the removal of the plant at the end of its life and the replanting of a new vine is simple and easy to accomplish. In this respect, removal simply requires cutting the vine where it exits from the interior of a container and pulling the coiled vine from the container. The replanting can be as simple as pulling the rooted vine from the growing media inside the container and introducing the roots of a new seedling into the growing opening and the growing media inside the container. Advantageously, all of the foregoing attributes not only provide for the increased production of tomatoes per plant but also reduce the labor required on a per plant basis by as much as 50% to 70% in comparison with the growing of tomatoes by conventional methods and equipment.

It is accordingly an outstanding object of the present invention to provide a new method and apparatus for growing vined produce, such as tomatoes, which provides considerable improvement relative to the conventional methods and equipment used to grow such produce from the ground up.

Another object is the provision of a method and apparatus for growing vined produce by which the time and labor is considerably reduced in comparison with that required for the conventional growing of such produce.

A further object is the provision of a method and apparatus for growing tomatoes by which the tomatoes ripen quicker and the production per plant is increased in comparison with conventional methods of growing tomato plants.

Still a further object is the provision of a method and apparatus of the foregoing character by which the vined produce are grown above the floor or ground, thus promoting the ability to protect the plants from insects, viruses and/or rodents.

Another object is the provision of a method and apparatus for growing vined produce which can be used to advantage in a home environment as well as in a commercial environment such as a greenhouse.

DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which:

FIG. 1 is a perspective view of vined produce growing apparatus in accordance with the present invention;

FIG. 2 is a front elevation view of the growing container of the apparatus;

FIG. 3 is a sectional elevation view of the vine support and guide component taken along line 3—3 in FIG. 2;

FIG. 4 is a sectional elevation view of a feeding opening for the apparatus;

FIG. 5 is a perspective view of one end of the growing container looking in the direction from left to right in FIG. 1;

FIG. 6 is a perspective view of the opposite end of the container; and,

DESCRIPTION OF A PREFERRED EMBODIMENT

Figure 7A:
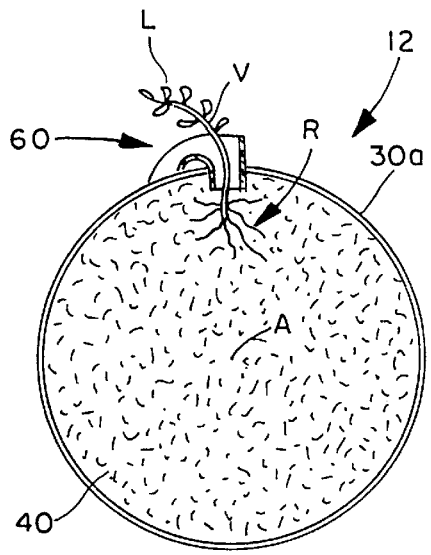
FIGS. 7A–7D schematically illustrate the method of growing tomatoes in accordance with the invention.

Referring now in greater detail to the drawings, wherein the showings are for the purpose of illustrating a preferred embodiment of the invention only and not for the purpose of limiting the invention, tomato growing apparatus in accordance with the present invention comprises a stand 10 for supporting a growing container 12 above an underlying surface S and for rotation about a horizontal container axis A. In the embodiment illustrated, stand 10 comprises a pair of axially spaced apart upright supports each comprised of telescopically interengaged lower and upper support members 14 and 16, respectively. The stand fisher comprises upper and lower cross members 18 and 20, respectively, which extend between the upright supports and are suitably interconnected therewith such as by elbow couplings 22 between cross member 18 and upper support members 16 and T-shaped couplings 24 between cross member 20 and the lower ends of lower support members 14. Couplings 24 also couple forwardly and rearwardly extending support feet members 26 with the upright supports. Preferably, lower support members 14 slidably receive upper members 16 to facilitate separation of the upper and lower portions of the stand to facilitate transportation and storage thereof and, in the embodiment illustrated, upper members 16 are apertured to receive retaining pin components 28 which seat against the upper ends of lower members 14 to support the upper portion of the stand in an assembled position relative to surface S. While not shown, it will be appreciated that upper members 16 can be provided with a plurality of spaced apart openings therealong for receiving pins 28 and which would provide for selectively adjusting the height of stand 10 relative to surface S. The stand preferably supports container 12 at a height of from five to six feet above surface S. Preferably, the components of the stand are metal tubes and the couplings therefor can be either metal or plastic.

Growing container 12 comprises a cylindrical body portion 30 providing a peripheral wall 30a coaxial with axis A and having axially opposite ends 30b and 30c respectively closed as set forth more fully hereinafter by end members 32 and 34. The end members include a corresponding hub portion 32a and 34a extending across the corresponding open end of peripheral wall 30a and corresponding cylindrical handle portions 32b and 34b extending radially outwardly of peripheral wall 30a for the purpose set forth more fully hereinafter. The hub portion of each end member includes a mounting flange 36, one of which is shown in FIG. 4 in connection with end member 34, and flange 36 extends axially inwardly along the inner surface of peripheral wall 30a and is secured thereto by a plurality of threaded fasteners 38, whereby each of the end members is removably mounted on body member 30. As will be appreciated from the description of the growing container thus far, hub portions 32a and 34a of end members 32 and 34 provide end walls closing the axially opposite ends of peripheral wall 30a and providing the container with an interior for receiving a rooting media 40 which, as is well known, is a root supporting material such as, for example, a hydrophilic polymer, rock wool, perlite, a Styrofoam media, gravel, sand, vermiculite, cellulose fibers, and the like.

Container 12 is supported on stand 10 for rotation about axis A by pillow blocks 42 and 44 mounted on upper support members 16 of the stand such as by threaded fasteners, not shown, extending axially outwardly of the pillow block and into the inner side of the corresponding support member 16. Stub shafts 46 and 48 integral with the hub portions of end members 32 and 34, respectively, are respectively received in pillow blocks 42 and 44, whereby it will be appreciated that container 12 can be readily lifted from the pillow blocks and removed from the stand. Handle portions 32b and 34b of the end members can be utilized to facilitate such removal of the container from the stand, such as for filling the interior thereof with a rooting media and the remounting of the container on the stand. The handles also facilitate rotating the container about axis A for the purpose set forth hereinafter. Preferably, for the reason which will become apparent hereinafter, hub portion 34a of end member 34 is provided with a radially stepped cam 50 coaxial with stub shaft 48 and having four radially outwardly extending shoulders 52 equally spaced apart about axis A, and pillow block 44 is provided with a resilient finger 54 which extends into the path of shoulders 52. Finger 54 is adapted to ride along the successive cam surfaces defined between circumferentially adjacent shoulders 52 in response to rotation of the container in one direction and to engage against one of the shoulders so as to preclude rotation of the container in the opposite direction. Preferably, body portion 30 and end members 32 and 34 of the container and the pillow blocks are all of suitable plastic material such as PVC.

Body portion 30 of container 12 is provided with a plant opening 56 radially through peripheral wall 30a adjacent end member 32 and, preferably, with four feeding openings 58 equally spaced apart about axis A and adjacent end member 34 of the container. As set forth more fully hereinafter, plant opening 56 is used to introduce the roots or planting cube of a seedling into rooting media 40, and feeding openings 58 are used to introduce a liquid nutrient into the rooting media during growth of the tomato vine. Preferably, plant opening 56 is provided with a support and guide member 60 of plastic material which includes a tubular mounting portion 62 extending radially through opening 56 into rooting media 40 and an outer support and guide portion defined by an arcuate and circumferentially extending bottom wall 64 and axially spaced apart side wall 66 which cooperate with the bottom wall to provide a cradle for supporting the vine as the latter proceeds to grow from the seedling stage. Likewise, each of the feeding openings 58 is preferably provided with a funnel-shaped member 68 having a base portion 70 extending radially inwardly through the feeding opening and an outer portion 72 extending from the mounting portion and diverging radially outwardly of the feeding opening for receiving liquid nutrient and delivering the latter to rooting material 40.

In the preferred embodiment, as best seen in FIG. 1, stand 10 is provided with an open top reservoir 74 for holding a liquid nutrient. Reservoir 74 is secured between side members 16 such as by a plurality of threaded fasteners 76. A liquid nutrient pump 78 is supported in reservoir 74 and includes an electrical cord 80 for connecting the pump to a source of power and an outlet conduit including plastic tubing 82 of sufficient length to extend from receptacle 74 to the uppermost one of the funnels 68 of growing container 12. A growing light 84 is suspended from cross member 18 of the stand to extend axially across growing container 12 and includes an electrical cord 86 for connecting the light to a source of power. In the preferred embodiment, pump 78 and growing light 84 are adapted to be connected to a source of electrical power through a timer 88 having a power cord 90 for connection to a source of alternating current. Each of the pump 78 and growing light 84 has an on and off condition, and timer 88 is a dual function timer operable to turn pump 78 on so as to pump liquid nutrient from receptacle 74 to the interior of growing container 12 at selected times during a 24 hour period and for durations selected to introduce a predetermined amount of liquid nutrient into the growing container each time the pump is activated. Likewise, timer 88 is operable to turn the growing light on at preselected times during a 24-hour period and for a preselected duration each time the light is turned on. In connection with delivering liquid nutrient to the growing container, it will be appreciated that one of the funnels 68 will open downwardly toward receptacle 74 so that any excess liquid nutrient introduced into the uppermost funnel during a particular feeding will return to receptacle 74. The liquid nutrient can be water alone but, preferably, would include other growth promoting ingredients.

Figure 7B:
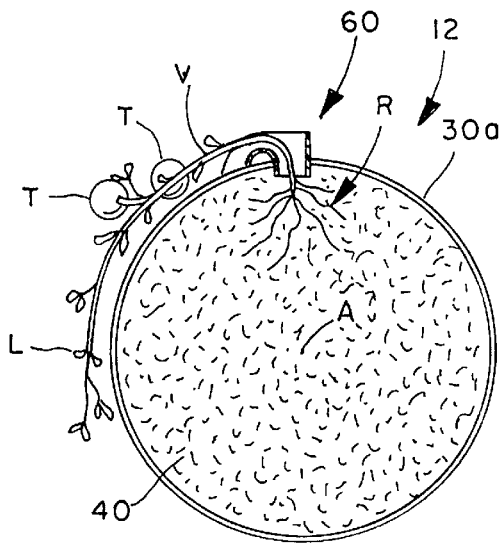
Figure 7C:
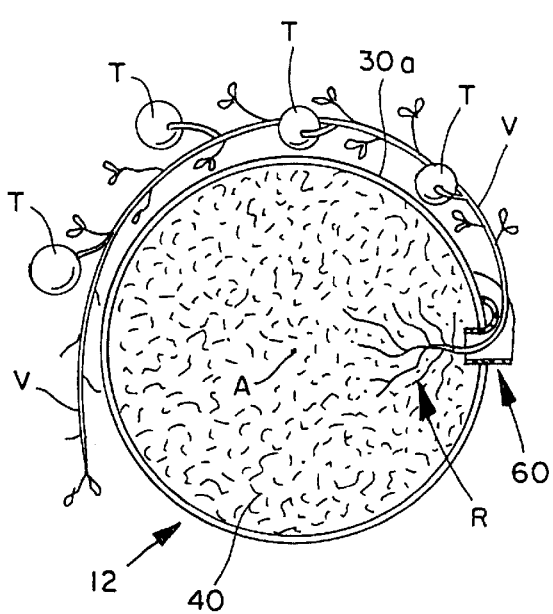
Figure 7D:
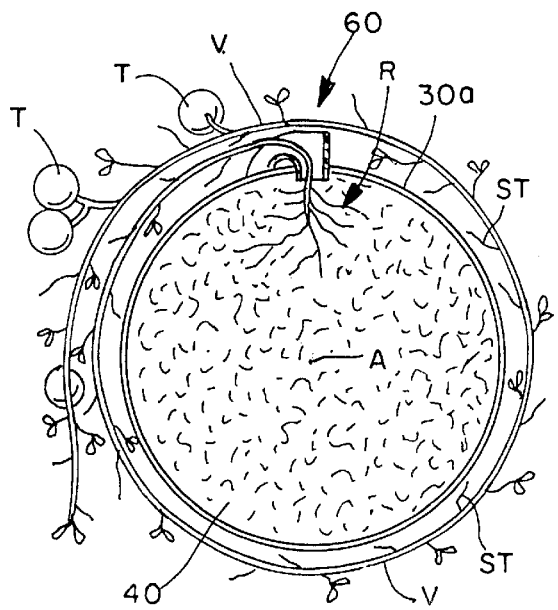

The method of growing tomatoes in accordance with the present invention will be understood from the following description in connection with the schematic illustrations of the growing container and vine in FIGS. 7A–7D of the drawing. A tomato plant will be started as a seedling outside the growing container for a period of about four weeks. The seedling, as depicted in FIG. 7A comprises a root end R, a vine V and leaves L. The root end of the seedling may be in a growing cube and, in any event, is introduced through the plant opening and into the rooting media 40 in container 12 for the vine to extend outwardly through the plant opening as defined by support and guide member 60. Initially, liquid nutrient is introduced into the rooting media through the plant opening, and once root and growth of the seedling is established, liquid nutrient is introduced into the container through the uppermost one of the four funnels opening into the interior of the container. As schematically illustrated in FIG. 7B, as the plant begins to grow it slowly falls downward about peripheral wall 30a of the container and the bottom portion of support and guide member 60 supports the vine against breaking in being pulled laterally of the plant opening by the weight of the tomatoes which grow thereon. When the vine and tomatoes thereon have grown outwardly and downwardly of container 12 to an extent of about five feet, the container is rotated so as to position the growing tomatoes on the upper side of the container, as schematically illustrated in FIG. 7C. As the vine continues to grow, and which growth can reach up to 25 feet or so during the life of the plant, the ripe tomatoes are harvested from the vine leaving stems ST and the container is periodically rotated during the growth period to continuously wrap vine V about the outer periphery of wall 30a of the container, as schematically illustrated in FIG. 7D. At the end of the plant's life, the vine is cut at the entrance to the plant opening and the coiled vine is removed from the container by sliding the vine axially therefrom. In the embodiment of the growing container illustrated in FIGS. 1–6, it will be appreciated that the growing container would be removed from the support stand and the coiled vine would either be worked over the handle portion of one of the end members of the container or, alternatively, one of the end members would be removed to facilitate removal of the coiled vine from body portion 30 of the container. Further in connection with the apparatus illustrated in FIGS. 1–6, it will be appreciated that liquid nutrient is introduced into the growing container periodically and, for example, four times during a 24-hour period and each time for an interval sufficient to maintain a desired degree of moisture in the rooting media. Likewise, grow light 84 will be turned on and off during a 24-hour period and, for example, for a 12-hour period at nighttime. As will be appreciated from the description hereinabove with regard to the apparatus, cycling of the pump and grow light is preferably controlled by a timer although it will be appreciated that the functions of feeding and lighting the growing plant can be achieved manually. The life of a plant may be as much as nine months and the growth of the vine, as mentioned above, can be as much as 25 feet or more. If desired, to optimize exposure of the tomatoes to light, the leaves can be pruned from the vine as it emerges from the plant opening.

While considerable emphasis has been placed herein on a preferred embodiment of apparatus for growing tomatoes in accordance with the invention, it will be appreciated that other embodiments of apparatus can be provided and that many changes can be made in the embodiment herein illustrated and described without departing from the principles of the invention. In particular in this respect, the provision of a stand for rotatably supporting the growing container and the provision of a liquid nutrient reservoir and pump and grow light on the stand is intended primarily for use by a home owner or apartment dweller as opposed to a commercial usage such as in a greenhouse. In the latter environment, wherein 1,000 or more plants might be grown simultaneously, nutrients would generally be provided by individual nutrient lines off of a header, and any special lighting for promoting growth would not necessarily be confined to a single plant or growing container. Furthermore, the containers could be supported on underlying fixed rollers at a plurality of growing stations adjacent one another along an elongated support table elevated above the floor of the greenhouse, and the containers could be rotated in tandem such as by a common chain drive therebetween and a drive motor for the latter. With regard to the growing container, the latter could be defined by container halves split between the opposite ends of the container, or the container could be permanently closed at the opposite ends and provided with an access opening to the interior thereof such as through the peripheral wall to provide for filling the interior with rooting media. Moreover, the opposite ends of the container could be provided with knobs in place of the handles to facilitate rotation of the container or, alternatively, the container can be rotated without the use of handles or knobs, although one or the other of the latter is preferred in that the handles or knobs facilitate carrying the container in connection with dismounting and mounting thereof on the stand or other support. Still further, the container can be other than cylindrical in cross section and in this respect could, for example, have a polygonal contour and cross section. With regard to the stand, illustrated and described in connection with the preferred embodiment, it will be appreciated that other stand structures can be devised to serve the purpose of supporting the container for rotation at a location elevated above an underlying support surface. The foregoing and other modifications of the preferred embodiment as well as other embodiments of the invention will be obvious and suggested to those skilled in the art upon reading the disclosure herein, whereby it is to be distinctly understood that the foregoing descriptive matter is to be interpreted merely as illustrative of the present invention and not as a limitation.

Having thus described the invention, it is so claimed:

1. Apparatus for growing vined produce, comprising a container having an axis, a peripheral wall extending about said axis and having axially spaced apart opposite ends, and end walls closing said peripheral wall at said opposite ends, said peripheral wall and said end walls providing said container with an interior for receiving a rooting media, a plant opening radially through said peripheral wall for the vine of a plant rooted in a rooting media in said interior to extend outwardly of said peripheral wall, and support means for supporting said container for said axis to be in a fixed location spaced above an underlying support surface and for rotation of said container about said axis and relative to said support means at said fixed location.

2. Apparatus according to claim 1, wherein said means for supporting said container includes a stand having a lower end for engaging said underlying surface and means on said stand for supporting said container for rotation about said axis relative to said stand at said fixed location spaced above said underlying surface.

3. Apparatus according to claim 2, wherein said means for supporting said container further includes means on said end walls rotatably engaging said means on said stand.

4. Apparatus for growing vined produce, comprising a container having an axis, a peripheral wall extending about said axis and having axially spaced apart opposite ends, and end walls closing said peripheral wall at said opposite ends, said peripheral wall and said end walls providing said container with an interior for receiving a rooting media, a plant opening radially through said peripheral wall for the vine of a plant rooted in a rooting media in said interior to extend outwardly of said peripheral wall, and means for supporting said container for rotation about said axis, and at least one feeding opening radially through said peripheral wall for introducing a nutrient into the rooting media.

5. Apparatus according to claim 4, wherein said apparatus includes four feeding openings equally spaced apart about said axis.

6. Apparatus according to claim 4, wherein said feeding opening and said plant opening are axially spaced apart along said peripheral wall.

7. Apparatus according to claim 4, further including means for pumping a liquid nutrient to said feeding opening.

8. Apparatus according to claim 7, wherein said means for pumping includes a reservoir for a liquid nutrient, a pump in said reservoir, and a hose for communicating said pump with said feeding opening.

9. Apparatus according to claim 8, and timing means for periodically cycling said pump between off and on conditions.

10. Apparatus according to claim 9, wherein said means for supporting said container for rotation includes a stand having a lower end for engaging an underlying surface and means on said stand for supporting said container for rotation relative to said stand at a location spaced above said underlying surface.

11. Apparatus according to claim 10, and a growing light mounted on said stand.

12. Apparatus according to claim 11, wherein said timing means includes means for periodically cycling said growing light between off and on conditions.

13. Apparatus according to claim 12, wherein said apparatus includes four feeding openings equally spaced apart about said axis.

14. Apparatus according to claim 13, wherein said feeding opening and said plant opening are axially spaced apart along said peripheral wall.

15. Apparatus according to claim 14, and a funnel member extending radially inwardly through each feeding opening for directing a liquid nutrient into said rooting media.

16. Apparatus according to claim 13, and a plant support and guide member having a mounting portion extending radially inwardly through said plant opening and an outer support and guide portion extending arcuately and circumferentially of said peripheral surface from said plant opening.

17. Apparatus according to claim 4, wherein said feeding opening and said plant opening are axially spaced apart along said peripheral wall and wherein said apparatus includes four feeding openings equally spaced apart about said axis.

18. Apparatus according to claim 17, and a plant support and guide member having a mounting portion extending radially inwardly through said plant opening and an outer support and guide portion extending arcuately and circumferentially of said peripheral surface from said plant opening.

19. Apparatus according to claim 18, and a funnel member extending radially inwardly through each feeding opening for directing a liquid nutrient into said rooting media.

20. Apparatus according to claim 19, wherein said means for supporting said container for rotation includes a stand having a lower end for engaging an underlying surface and means on said stand for supporting said container for rotation relative to said stand at a location spaced above said underlying surface, and means on said end walls of said container rotatably engaging said means on said stand.

21. Apparatus according to claim 20, further including a reservoir mounted on said stand for a liquid nutrient, a pump in said reservoir, a hose for selectively communicating said pump with one of the funnels, and a growing light mounted on said stand.

22. Apparatus according to claim 21, and timing means for periodically cycling said pump and cycling said growing light between respective off and on conditions.

23. Apparatus for growing vined produce comprising, a container having an axis, a circular wall surrounding said axis and having axially spaced apart opposite ends, and end walls closing said opposite ends, said circular wall and said end walls providing said container with an interior for receiving a rooting media, at least one of said end walls being removable for introducing a rooting media into said interior, a plant opening radially through said circular wall for the vine of a plant rooted in a rooting media in said interior to extend outwardly through said circular wall, at least one feeding opening radially through said circular wall for introducing a nutrient into the rooting media, and a stand including means interengaging with said container end walls for supporting said container for rotation about said axis.

24. Apparatus according to claim 23, wherein said apparatus includes four feeding openings equally spaced apart about said axis and axially spaced from said plant opening.

25. Apparatus according to claim 23, and a funnel member extending radially inwardly through each feeding opening for directing a liquid nutrient into said rooting media.

26. Apparatus according to claim 23, and a plant support and guide member having a mounting portion extending radially inwardly through said plant opening and an outer support and guide portion extending arcuately and circumferentially of said peripheral surface from said plant opening.

27. Apparatus according to claim 26, and a funnel member extending radially inwardly through each feeding opening for directing a liquid nutrient into said rooting media.

28. Apparatus according to claim 27, wherein said apparatus includes four feeding openings equally spaced apart about said axis and axially spaced from said plant opening.

29. Apparatus according to claim 23, further including a reservoir mounted on said stand for a liquid nutrient, a pump in said reservoir, and a hose for selectively communicating said pump with one of the funnels.

30. Apparatus according to claim 29, and timing means for periodically cycling said pump between off and on conditions.

31. Apparatus according to claim 29, and a growing light mounted on said stand.

32. Apparatus according to claim 31, and timing means for periodically cycling said light between off and on conditions.

33. Apparatus according to claim 23 further including a reservoir mounted on said stand for a liquid nutrient, a pump in said reservoir, a hose for selectively communicating said pump with one of the funnels, and a growing light mounted on said stand.

34. Apparatus according to claim 33, and timing means for periodically cycling said pump and cycling said growing light between respective off and on conditions.

35. Apparatus according to claim 23, wherein said apparatus includes four feeding openings equally spaced apart about said axis and axially spaced from said plant opening, a funnel member extending radially inwardly through each feeding opening for directing a liquid nutrient into said rooting media, and a plant support and guide member having a mounting portion extending radially inwardly through said plant opening and an outer support and guide portion extending arcuately and circumferentially of said peripheral surface from said plant opening.

36. Apparatus according to claim 35, further including a reservoir mounted on said stand for a liquid nutrient, a pump in said reservoir, a hose for selectively communicating said pump with one of the funnels, and a growing light mounted on said stand.

37. Apparatus according to claim 36, and timing means for periodically cycling said pump and cycling said growing light between respective off and on conditions.

38. A method of growing vined produce, comprising: providing a container having a horizontal axis, an interior defined by a peripheral wall extending about said axis and end walls closing said peripheral wall, and a plant opening through said peripheral wall to said interior, providing a rooting media in said interior, planting the root end of a plant vine in said rooting media for the vine to extend outwardly through said plant opening, supporting said container above an underlying surface for said axis to be in a fixed location above said surface and for rotation of said container about said axis at said fixed location, introducing a nutrient into said rooting media to promote growth of the vine, periodically harvesting produce from the vine, and periodically rotating said container about said axis at said fixed location to wrap the vine thereabout.

39. A method of growing vined produce, comprising: providing a container having a horizontal axis, an interior defined by a peripheral wall extending about said axis and end walls closing said peripheral wall, and a plant opening through said peripheral wall to said interior, providing a rooting media in said interior, planting the root end of a plant vine in said rooting media for the vine to extend outwardly through said plant opening, supporting said container above an underlying surface for rotation about said axis, introducing a nutrient into said rooting media to promote growth of the vine, periodically harvesting produce from the vine, periodically rotating said container about said axis to wrap the vine thereabout, and initially introducing said nutrient into said rooting media through said plant opening.

40. The method according to claim 39, wherein said container further includes four feeding openings through said peripheral wall equally spaced apart about said axis, said periodic rotation of said container positioning one of said feeding openings above said axis, and introducing said nutrient into said rooting media through said one of said feeding openings.

41. The method according to claim 38, and periodically exposing the vine outside said container to a grow light.

42. The method according to claim 41, and timing the frequency and duration of the exposure of the vine to said grow light.

43. The method according to claim 38, and periodically introducing said nutrient into said rooting media.

44. The method according to claim 43, and timing the frequency and duration of the introduction of nutrient into said rooting media.

45. The method according to claim 38, and periodically exposing the vine outside said container to a grow light and periodically introducing said nutrient into said rooting media.

46. The method according to claim 45, and timing the frequency and duration of the exposure of the vine to said grow light and timing the frequency and duration of the introduction of nutrient into said rooting media.

47. The method according to claim 46, wherein said container further includes four feeding openings through said peripheral wall equally spaced apart about said axis, said periodic rotation of said container positioning one of said feeding openings above said axis, and introducing said nutrient into said rooting media through said one of said feeding openings.

48. A method of growing vined produce comprising, rooting the vine of a plant in a container having a horizontal axis, supporting the container above an underlying surface for said horizontal axis to be in a fixed location about said surface and for rotation of said container about said horizontal axis at said fixed location, introducing a nutrient to said container to promote growth of said plant, and periodically rotating said container about said axis at said fixed location to wind the vine of the plant about said container as the plant grows.

49. The method according to claim 48, and periodically harvesting produce from the vine.

\* \* \* \* \*